(No Model.)
A. HAARLANDER.
FLUSHING TANK FOR WATER CLOSETS.
No. 441,097. Patented Nov. 18, 1890.
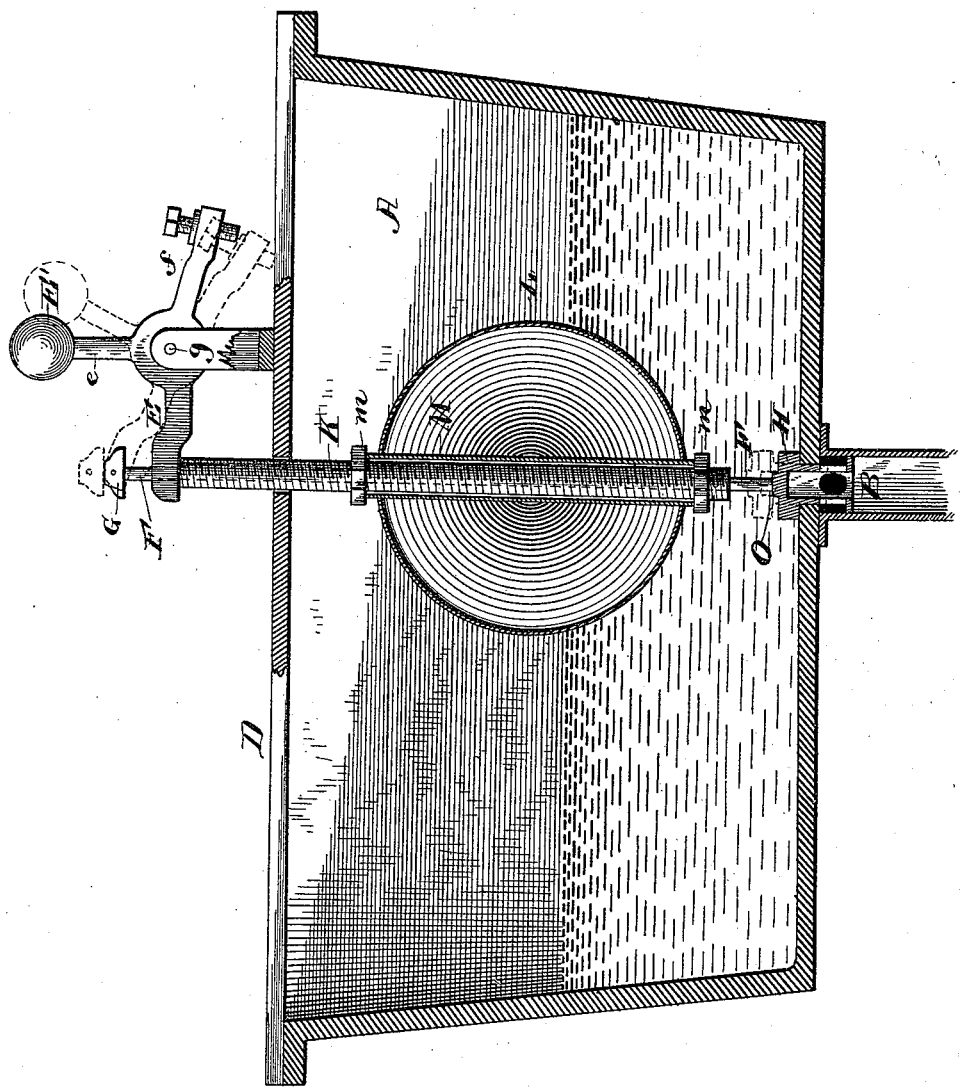

UNITED STATES PATENT OFFICE.

AUGUST HAARLANDER, OF ALLEGHENY, PENNSYLVANIA.

FLUSHING-TANK FOR WATER-CLOSETS.

SPECIFICATION forming part of Letters Patent No. 441,097, dated November 18, 1890.

Application filed June 25, 1890. Serial No. 356,663. (No model.)

*To all whom it may concern:*

Be it known that I, AUGUST HAARLANDER, a citizen of the United States, residing at Allegheny, in the county of Allegheny and State of Pennsylvania, have invented certain new and useful Improvements in Flushing-Tanks for Water-Closets, &c.; and I do hereby declare the following to be a full, clear, and exact description of the invention, reference being had to the accompanying drawing, which form part of this specification.

This invention has relation to flushing-tanks for water-closets, &c., and has for its object the provision of novel means for automatically producing a flow of water from the tank at regular and predetermined intervals.

The invention consists in the novel construction, combination, and arrangement of devices hereinafter particularly described and claimed, the same comprising a suitable float which may be adjusted to regulate the periods or intervals of discharge of water from the tank, a rod passing vertically through the float, but not connected therewith, attached at its lower end to the escape-valve and operatively coupled at its upper end to a gravity-lever, by the movements of which the escape-valve is opened and closed, and a tube upon which the float is mounted and adjustably arranged, and which constitutes the medium through which the balance of the gravity-lever is disturbed, so as to cause the latter to perform its operative functions.

In the accompanying drawing the figure is a vertical transverse sectional view of a flushing-tank provided with my improvements.

A designates the flushing-tank, provided with a suitable escape-valve B, which may, if desired, be the priming-valve of a siphon-escape or an ordinary overflow escape-valve.

D designates the usual bridge of the tank, upon which, for the purposes of my invention, is pivoted a gravity-lever E—that is, a lever having an upright weighted arm *e*— which may be swung to either side of the pivotal point *g*, after which it will fall by gravity and tilt the lever in the corresponding direction.

F designates a rod provided with a collar or nut G on its upper end, which rests on the long arm of the lever E, the latter being forked to embrace the rod. Said rod is connected at its lower end to the escape-valve H. The rod F passes loosely through a tube K, which in turn passes through the vertical center of the spherical float L, the latter being provided with a tube M, soldered to the shell and made air and water tight at the ends or joints. The tube K is threaded on its outer surface and carries the nuts *m m*, by which it is clamped or fastened to the float above and below and is made adjustable with reference to the float, so as to regulate the height of the latter. The tube K extends above and below the float. At its upper end it passes through a hole *n* in the bridge and terminates a short distance below the lever E, while its lower end is arranged and adapted to strike a collar O on the lower end of the rod F.

The quantity of water to be discharged is regulated by the adjustment of the float upon the threaded tube K. The lower the float is placed the smaller the quantity discharged, and vice versa. While the tank is filling the float gradually rises, and when the upper end of the tube K comes in contact with the end of the lever E it tilts the latter sufficiently to throw the weight E' over the center of the pivotal point, after which the lever falls by gravity, and in so doing lifts the rod F and with it the escape-valve. The float now descends with the water until the lower end of the tube K strikes the collar O, whereupon the rod F is depressed, the lever E tilted in the reverse direction, and the escape-valve caused to fall and close the escape-opening.

The float may, if necessary, be weighted in any desired manner so as to counterbalance the weight of the lever E.

The short arm *f* of the lever E is provided with a suitable adjustable stop *p* to limit the fall of the lever.

Having described my invention, what I claim as new, and desire to secure by Letters Patent, is—

In a flushing-tank, the combination of the float L, provided with the central tube M, the threaded tube K, upon which said float is mounted, having the clamping-nuts $m\ m$, the rod F, provided with the collars or nuts G O on its upper and lower ends, respectively, the gravity-lever E, and the escape-valve, substantially as described.

In testimony that I claim the foregoing I have hereunto set my hand this 13th day of May, 1890.

AUGUST HAARLANDER.

Witnesses:
 O. F. GRANT,
 W. H. BRADSHAW.